United States Patent

Yamaguchi et al.

(10) Patent No.: US 6,560,322 B2
(45) Date of Patent: May 6, 2003

(54) CENTRALIZED MANAGEMENT UNIT RECEIVING DATA FROM MANAGEMENT UNIT OF DIFFERENT COMMUNICATION METHODS

(75) Inventors: Ikunori Yamaguchi, Toyokawa (JP); Atsushi Tomita, Toyohashi (JP); Naohiro Yonezu, Toyohashi (JP); Masazumi Ito, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/311,726

(22) Filed: May 14, 1999

(65) Prior Publication Data

US 2002/0052879 A1 May 2, 2002

(30) Foreign Application Priority Data

May 15, 1998 (JP) .......................................... 10-133586
May 15, 1998 (JP) .......................................... 10-133587

(51) Int. Cl.⁷ .............................................. H04M 11/00
(52) U.S. Cl. .................................... 379/102.02; 707/10
(58) Field of Search ........................... 707/1–206, 7–10; 399/8; 709/300, 224; 379/90.01, 91.01, 91.02, 92.01, 92.02, 92.03, 92.04, 93.01, 93.02, 102.02; 705/30, 31, 32, 33, 34, 35

(56) References Cited

U.S. PATENT DOCUMENTS 5,491,535 A * 2/1996 Hirata et al. .................... 399/8
5,543,892 A * 8/1996 Hirata et al. .................... 399/8
5,673,190 A * 9/1997 Kahleck et al. ................. 700/2
5,890,029 A * 3/1999 Hirata et al. .................... 399/8
6,088,358 A * 7/2000 Tomita et al. ............... 370/395
6,105,867 A * 8/2000 Shimizu et al. ............. 235/383
6,111,591 A * 8/2000 Ohtake et al. ............... 345/501
6,314,406 B1 * 11/2001 O'Hagan et al. ............. 705/14
6,347,339 B1 * 2/2002 Morris et al. ................ 709/237

* cited by examiner

*Primary Examiner*—John Breene
*Assistant Examiner*—Cheryl Lewis
(74) *Attorney, Agent, or Firm*—Burns, Doane, Swecker & Mathis, LLP

(57) ABSTRACT

A management unit includes a collector for collecting various data of a connected unit, a connector to a communication line, a communicator transmitting the various data to a centralized management unit through the communication line. The management unit has at least two data communication processing methods, and includes a timer, a comparator for comparing the time measured by the timer with a time band set in advance in the centralized management unit, and a communication process initiator responsive to the results of comparison by the comparator for selecting a data communication processing methods and initiating a communication process. As a result, it is possible for one centralized management unit to manage a plurality of management units transmitting data in accordance with different communication methods.

17 Claims, 16 Drawing Sheets

PAPER DISCHARGE CODE : FALLING OF b0
JAM CODE : b7 = 1, b6 = 0
TROUBLE CODE : b7 = 1, b6 = 1

CENTRALIZED MANAGEMENT UNIT RECEIVING DATA FROM MANAGEMENT UNIT OF DIFFERENT COMMUNICATION METHODS

This application is based on application Nos. 10-133586 and 10-133587 filed in Japan, the contents of which is hereby incorporated by reference.

BACKGROUND OF THE INVENTION

1. Field of the Invention

The present invention relates to a management unit transmitting data from an apparatus to a centralized management unit through a communication line, and to the centralized management unit.

2. Description of the Related Art

Conventionally, a method of centralized processing and management in which management data of a plurality of copying machines are transmitted to a single central processing unit and batch-processed and managed by the central processing unit has been known from, for example, U.S. Pat. No. 4,583,834. Further, an apparatus for managing a plurality of copying machines in which management data of each of the copying machines are transmitted to a single central control unit through respective terminal units to be processed by the central control unit has been known from U.S. Pat. No. 4,583,834.

The conventional central processing unit or the central management unit does not allow a plurality of copying machine management units transmitting data in accordance with different communication methods to be connected to one centralized management unit for the management of each copying machine. Here, different communication methods refer to CCITT method and Bell method, for example.

Among the various communication systems, some communication protocols are determined by standard. However, in most cases, the communication methods are not common or compatible. Therefore, when two different systems are to be integrated and managed, different communication protocols must be applied to one system mixedly. Consequently, it has been necessary to provide communication units in compliance with respective communication protocols separately, resulting in increased cost. This is a significant disadvantage for the user.

When communication protocols having similarities to some extent are to be integrated, it is possible to automatically determine the difference of communication protocol at the start of a communication session and to switch the communication protocol thereafter. Such an approach, however, requires much time for switching between the communication protocols, resulting in an overhead at that portion, and reliability in switching may possibly be degraded. Further, automatic determination is not available if the communication protocols do not have any similarities therebetween.

SUMMARY OF THE INVENTION

Therefore, an object of the present invention is to facilitate management of a plurality of systems employing different communication protocols by integrating the plurality of systems and using one centralized management unit and communication units connected thereto.

Another object of the present invention is to enable management of a plurality of management units transmitting data in compliance with difference communication methods through the use of one centralized management unit.

The management unit in accordance with the present invention, therefore, includes: a data collector collecting various data of connected units; a connector to a communication line; and a communicator transmitting the various data to a centralized management unit through the communication line. The management unit has at least two data communication processing methods, and includes a timer, a comparator comparing the time measured by the timer with a time band set in advance in the centralized management unit, and a communication process initiator responsive to the result of comparison by the comparator, for selecting the data communication processing method and initiating a communication process. The management unit or the centralized management unit initiate (switches) an appropriate communication processing method, and performs data communication in compliance with the communication process method.

Therefore, it becomes unnecessary to provide communication terminal units by the number of the communication processing methods, and lower efficiency and lower reliability resulting from the procedure of determining the communication protocol can be avoided.

If it is determined by the comparator that the time band allows no communication process in any data communication processing method, the method is switched to that data communication processing method which is set for a time band of a near future, and the control enters a communication standby state. The management unit further includes a detector for detecting any trouble or a warning state which requires a warning of the unit, and a transmission initiator for initiating a transmission process at the time of detection, and based on the result of comparison by the comparator, communication process is performed after standby until that time band which allows communication. The time band set in advance in the centralized management unit is input and stored from the management unit through the communication line.

According to another aspect of the present invention, the centralized management unit includes a communicator receiving, from a management unit including a collector collecting various data of connected units and a connector to a communication line, the various data through the communication line. The centralized management unit has at least two data communication processing methods, and includes a timer, a comparator comparing the time measured by the timer with a time band set in advance and a communication initiator responsive to the results of comparison by the comparator for selecting the data communication processing method and initiating a communication process. The time band set in advance in the centralized management unit is stored from the management unit through the communication line. Further the allocation of time bands to the communication processing methods is adjusted in accordance with the number of communication processing methods used by the management units for communication.

According to a further aspect of the present invention, units connected to a management unit are controlled by the centralized management unit by receiving various data through a communication line and a terminal adapter from the management unit including a collector for collecting various data of connected units and a connector to the communication line. The centralized management unit includes a terminal adapter allowing reception from a plurality of different management units having different communication methods to be used for transmitting various data over the communication line, and a setter for setting the communication method of the terminal adapter in accordance with a prescribed priority. Th centralized management unit further includes a switch for switching, when reception of the various data in accordance with the communication method set by the setter fails, the communication method to one having lower priority.

The centralized management unit sets the terminal adapter first to a communication method of a first or highest priority (for example, CCITT method), and stands by for the transmission of data from the management unit. When the terminal adapter succeeds in receiving data at the start of transmission of the data to the centralized management unit, data transmitted continuously in compliance with the communication method is received continuously. When the terminal adapter fails to receive the data in compliance with the communication method of the first priority, the communication method of the terminal adapter is switched to the communication method of a second priority (Bell method), and the adapter again stands by for the transmission of data from the management unit. Thereafter, the communication method of the terminal adapter is switched in accordance with the priority until the data is received successfully.

Accordingly, it becomes possible to manage by a single centralized management unit, a plurality of different management units transmitting data in accordance with different communication methods.

In a further aspect of the present invention, a unit management system includes a plurality of management units provided with a collector for collecting various data of connected units and a connector to a communication line, and a centralized management unit managing the units connected to the management units by receiving various data from each of the management units through the communication line and a terminal adapter. The centralized management unit includes a terminal adapter allowing reception from a plurality of different management units having different communication methods to be used for transmitting various data through the communication line, and a setter for setting the communication method of the terminal adapter in accordance with a prescribed priority. Preferably, the centralized management unit further includes a switch for switching, when reception of the various data in accordance with the communication method set by the setter fails, the communication method to one having lower priority.

In the centralized management unit and the unit management system, the units are managed in accordance with respective communication methods, based on the various data received.

In the centralized management unit and the unit management system, when data reception in accordance with a communication method of which priority is not the highest is successful, the communication method is returned to the one having the highest priority.

Further, in the centralized management unit and the unit management system, the communication method of the terminal adapter is set in accordance with the number of management units using respective communication methods for transmitting various data, that is, the communication method employed by larger number of management units is set with higher preference.

When data reception in compliance with a communication method of which priority for the terminal adapter is not the highest is successful, the communication method may be switched to the one having the highest priority, or the communication method of the terminal adapter is set in accordance with the number of management units in compliance with respective communication methods for transmitting various data. Therefore, possibility of completing data transmission at one time without the necessity of re-transmission of the data from the management unit becomes higher.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
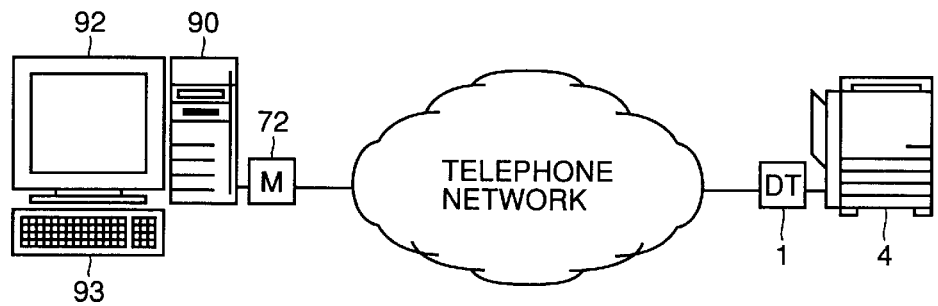
FIG. 1 is a schematic illustration presenting a system configuration to which an embodiment of the present invention is applied.
Figure 2:
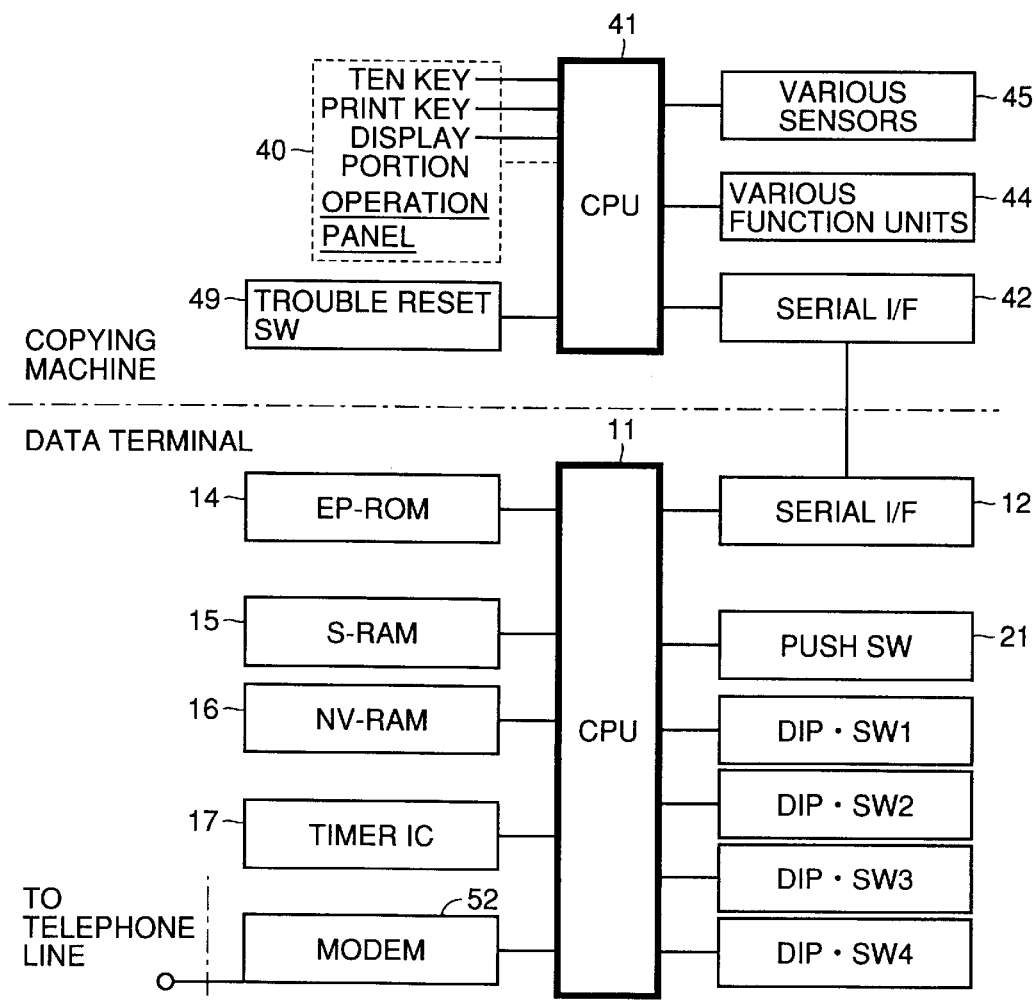
FIG. 2 is a part of a block diagram representing a circuit configuration of the system.
Figure 3:
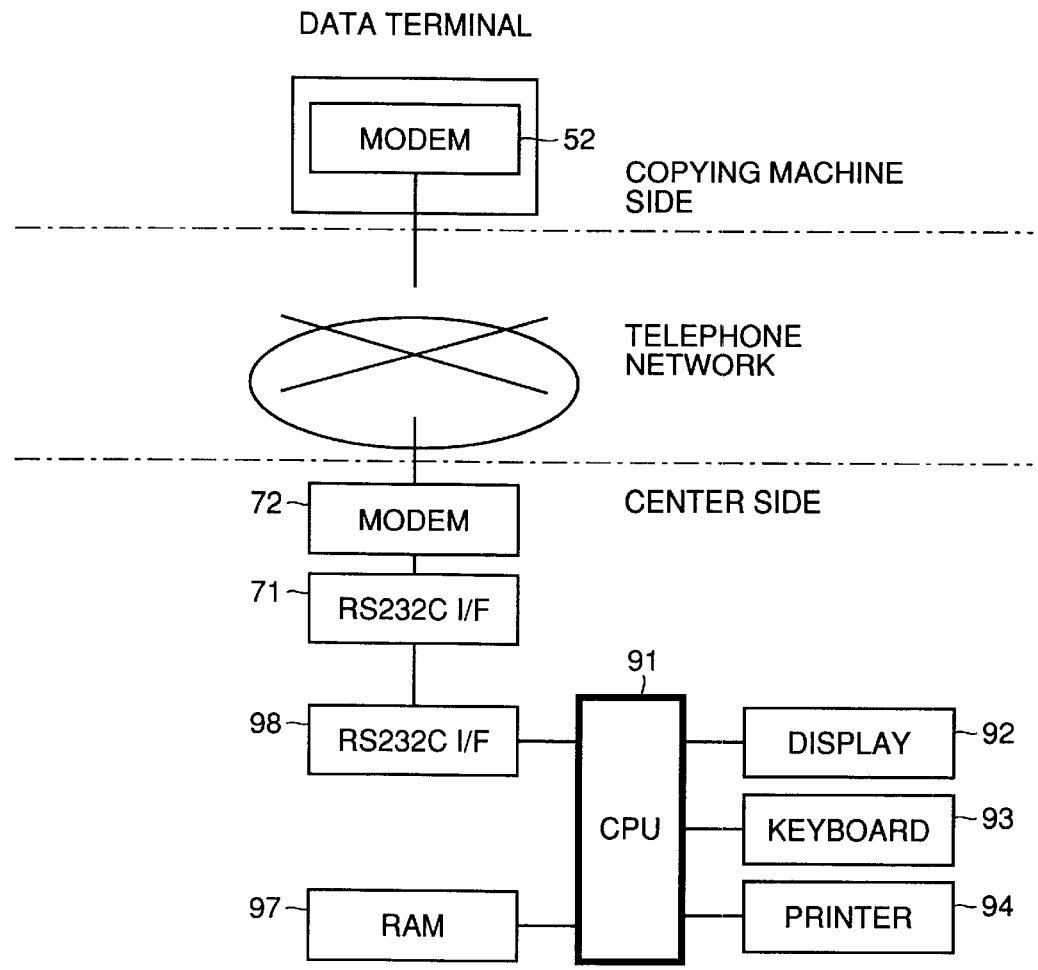
FIG. 3 is the remaining part of the block representing the circuit configuration of the system.

A copying machine management unit in accordance with an embodiment of the present invention will be described in the following with reference to the figures.

(1) First Embodiment

First, a configuration of a system implementing the method of managing a copying machine, including a copying machine, a data terminal (DT), a communication network and a center will be described.

Referring to FIGS. 1, 16, 2 and 3, the present system includes a user side unit, a center side unit, that is, managing side unit (centralized managing unit) and a telephone network connecting these to each other.

Copying machine 4 (4A, 4B and 4C of FIG. 16) and a data terminal 1 (communication unit) are provided as user side units. Data terminal 1 has a built in modem (terminal adapter) having a function of a communication terminal unit. A modem (terminal adapter) 72 having the function of a communication terminal unit and a computer 90 are provided as center side units. Computer 90 contains a CPU 91, and a display 92 and a keyboard 93 are connected to the computer.

Data terminal 1 is a unit for taking various information of copying machine 4, performing prescribed processing on the information, and transmitting the information to the center side computer 90. Center side units perform various diagnoses of computer 4, based on the data transmitted from data terminal 1. More specifically, the state of the copying machine, the cause of a failure, a counter measure to be used and reliability are found. Further, data for managing the copying machine are summed up.

Figure 16:
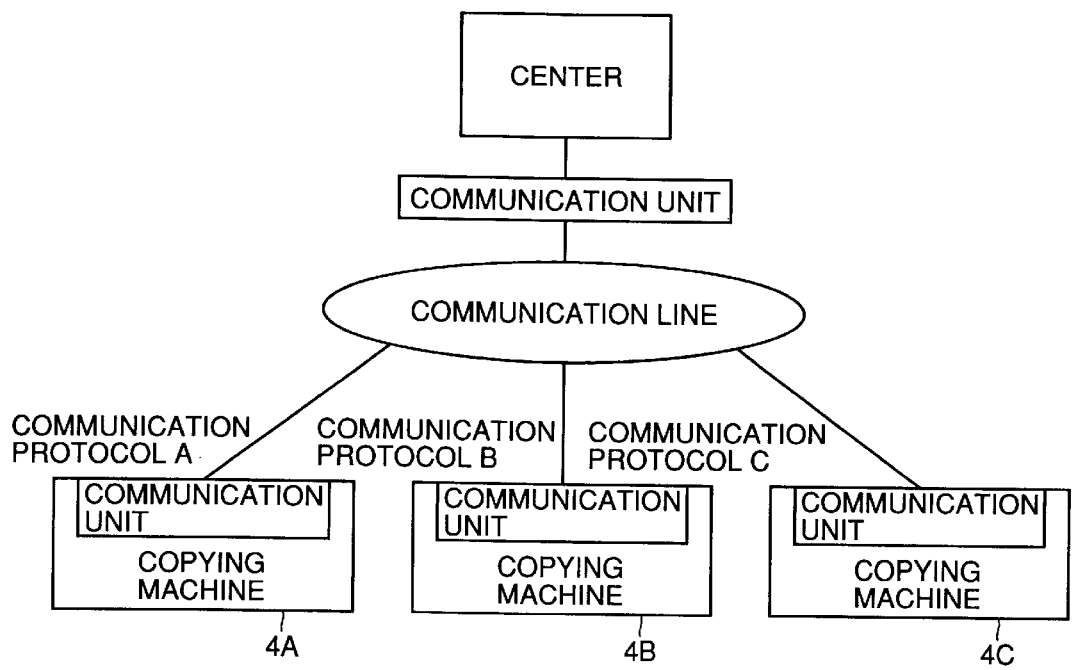
FIG. 16 is a schematic illustration representing system configuration and communication protocols to which an embodiment is applied.

As can be seen from FIG. 16, the center side units are connected to the communication line through a plurality of copying machines and a communication unit (data terminal 1). As the copying machines are originally fabricated to be managed by different management systems, the copying machines communicate with the center side units in compliance with mutually different communication protocols. Though in the present embodiment the copying machines are described as transmitting data to the center side units in accordance with different communication protocols, practically, a plurality of copying machines divided into groups in accordance with some communication protocols may be managed by the center.

The communication line includes a telephone line, a network and a radio network. It may be possible that the communication unit receives data with the communication line switched among these, and the communication protocol at that time may correspond to the communication line used.

Each of the user side and center side units will be described in the following. First, copying machine 4 (4a, 4b, 4c) reads an original image and forms a copy image on a sheet of paper.

Specific internal structures and the like of the copying machine are not described in detail as these are well known generally. (Only the portions related to the present invention will be described.).

In a CPU 41 of copying machine 4, various count values are counted by a counter providing basic information for billing copy charge calculated by the center (including a total counter indicating the number of sheets discharge and size by size sheet counter indicating the number of sheets used size by size), a counter providing information related to maintenance (including location by location jam counter indicating the number of jams at each location, a location by location trouble counter indicating the number of troubles experienced at each location, and a PM (Periodical Maintenance) counter counting the number of use of each part for providing basic information to perform periodical maintenance), and the counted values are transmitted through a serial I/F42 and a serial I/F12 to a CPU 11 of the data terminal 1.

In copying machine 4, various element data having influence on an image forming process (including the time required for conveying sheet, surface potential of a photoreceptor drum, toner concentration in a developer, amount of exposure of the photoreceptor drum, developing bias voltage, amount of toner adhered on the photoreceptor drum and a grid voltage of a corona charger) are detected by various sensors 45 arranged at various portions of the machine, taken to CPU 41 and transmitted to CPU 11 of data terminal 1 through serial I/F42 and serial I/F12.

The data terminal will be described in the following.

Data terminal 1 receives data transmitted from copying machine 4 through serial I/F42 and serial I/F12, and when a prescribed transmission condition (the condition that a transmission flag is set ON) which will be described in detail later is satisfied, activates the modem to establish connection of a communication line with the center side, and transmits copying machine management data (the element data, count data and so on described above) to a CPU 91 of the center.

To CPU 11 of data terminal 1, an ROM 14 storing a control program, a non-volatile memory 16 for storing data such as telephone number of the center, a battery back up working system RAM 15 and a battery back up timer IC 17 are connected. CPU 11 receives data transmitted from CPU 41 of copying machine 4 through serial I/F42 and serial I/F12, and executes a prescribed processing. Further, in response to operation input of various operation switches (a push switch 21, four dip switches DIP•SW1 to DIP•SW4), it sets a prescribed operation/mode.

Dip switch DIP•SW1 is for setting a center telephone number input mode; dip switch DIP•SW2 is for setting identification number (DT) of data terminal 1 input mode; dip switch DIP•SW3 is for setting an input mode for identification number (center) of the center; and dip switch DIP•SW4 is for setting an initialization mode, respectively. Push switch 21 is for instructing execution of an initial transmission, for example.

Figure 4:
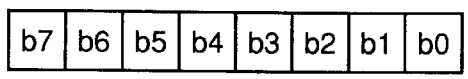
FIG. 4 represents codes transmitted from a copying machine within the system to a connected data terminal.

The 8 bit data b7–b0 input from serial I/F12 to data terminal 1 have such a configuration as shown in FIG. 4.

More specifically, a paper discharge code indicative of paper discharge is represented by a falling edge of bit b0 (transition from 1 to 0), and a jam code indicative of occurrence of a paper jam is represented by bit b7=1 and b6=0. A trouble code indicative of occurrence of various troubles is represented by bit b7=1 and bit b6=1. The above described 8 bits of data are input periodically to data terminal 1, and in addition, input when a paper jam or a trouble occurs in copying machine 4.

Control CPU 11 of data terminal 1 is so configured that it can instruct modem 52 to call a center side modem 72. Accordingly, it becomes possible to establish a connection of communication line with center side modem 72 and to perform communication with center side CPU 91. The content of data (data for managing copying machine 4) transmitted from CPU 11 through the communication line to center side CPU 91 are determined by the type of a transmission flag which is set ON, as will be described later.

Center side units will be described in the following.

The center side unit is a computer containing a modem 72 and interfaces RS232CI/F 71 and 98 allowing connection through a telephone circuit to data terminals 1 of various users. CPU 91 of the computer manages copying machines 4 corresponding to respective ones of the data terminals 1.

Figure 17:
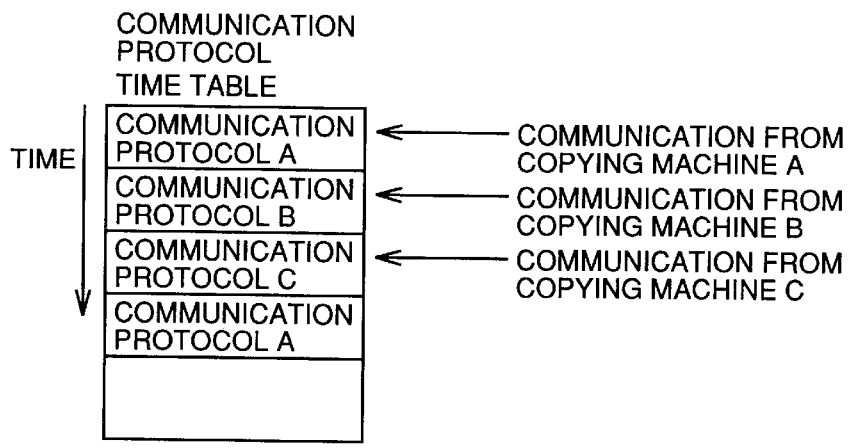
FIG. 17 is a time table of a communication protocol.

The center side unit has such a timing table for switching communication protocols divided into prescribed time bands such as shown in FIG. 17, and communication protocols 17 are switched in accordance with the table. The length of time division of the time band may be determined in accordance with the number of communication protocol groups of the copying machines to be managed.

The time table stored in the center side unit and the present time managed by the center side unit are transmitted to the copying machine by a communication process. Therefore, it is possible for the center side and the copying machine side to perform selection of transmission protocol in synchronization with each other in accordance with the same time table and same time.

Figure 18:
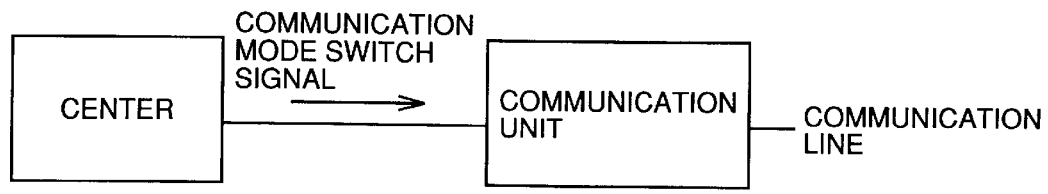
FIG. 18 is a schematic illustration representing signal flow from the center to a communication line.

The process for switching the communication protocols is performed by transmitting a signal for switching communication protocols to a communication unit connected to the center (FIG. 18), or performed by switching an internal mode of the center side communication protocol processing, so as to switch an operation mode of waiting in accordance with a method of standby of a reception signal corresponding to each communication unit.

The operation control in accordance with the present embodiment will be described with reference to the flow charts. Prior to the description, the terms "on edge" and "off edge" will be defined. When the state of a switch, a sensor or a signal, for example, makes a transition from an off state to an on state, the state transition will be referred to as "on edge", and when the state changes from on to off, the state transition will be referred to as "off edge".

Figure 5:
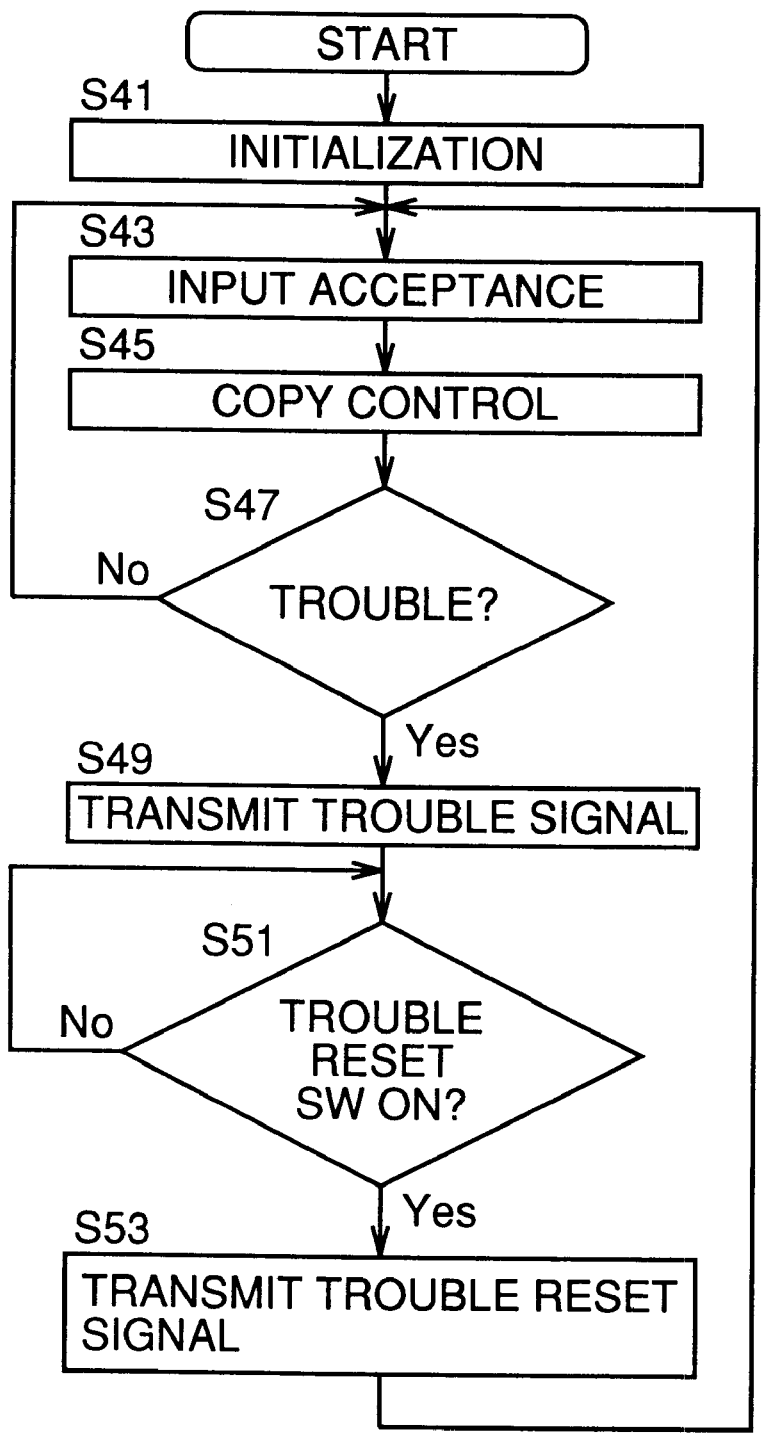
FIG. 5 is a flow chart representing a main routine of the process performed by the CPU of the copying machine.

Operation control of copying machine 4 (processing in CPU 41) will be described with reference to the flow chart of FIG. 5.

First, processing of CPU 41 starts when the power is turned on, for example, and initialization including clearing of a memory and setting of standard mode, for example, takes place (step S41). Thereafter, the flow proceeds to step S43 for input reception, and to step S45 for copy control process. In step S43, a process for receiving various input signals is performed. The input signal includes, for example, input signals from key switch groups on an operation panel 40 of the copying machine and input signals from sensor group 45 at various portions of the copying machine. In step S45, processes necessary for copying operation, for example, are performed. The processes necessary for copying operation refer to control of various functioning portion 44 including, for example, paper feed control, operation control, photoreceptor drum control and developer control.

When a trouble such as paper feed failure (jam), machine control failure or malfunction occurs (YES in step S47), a signal corresponding to the trouble occurred is transmitted to CPU 11 (step S49). Further, when a trouble reset switch 49 is operated by an operator, for example, (YES in step S51), a trouble reset signal is transmitted to CPU 11 (step S53). In response, a process, which will be described later, takes place in CPU 11.

Operation control of data terminal 1 (processing of CPU 11) will be described with reference to the flow charts of FIG. 6 to 12. First, the outline of the process will be described with reference to the main routine of FIG. 6.

In CPU 11, process starts when the power is turned on. When initialization mode is set (YES in step S11), initialization process (step S13) is performed and thereafter, a copy permission signal is transmitted to CPU 41 of the copying machine (step S15). If the initialization mode is not set (NO in step S11), copy permission signal is transmitted immediately (step S15), and the processes of steps S15 to S31 are executed repeatedly.

The initialization of step S13 is executed when dip switch DIP•SW4 is set to the ON state at the start of processing in data terminal 1, that is, when the initialization mode is set (YES in step S11). In the initialization process, telephone number of the center, the number of the data terminal (DT) and the number of the center (center) are set, and initialization transmission is performed.

When the copy permission signal is transmitted in step S15, data reception process of step S17 is performed. In step S17, various data related to the states of the copying machine transmitted from CPU 41 are received. The contents of the data include paper discharge code, jam•trouble code, jam•trouble counter value, size by size sheet count value, PM count value and element data value. CPU 11 holds the latest values of these data.

Thereafter, the flow proceeds to step S17, in which emergency transmission determining process is performed. In step S17, whether trouble data and trouble recovery data are to be transmitted to the center side or not is determined, for example, of which details will be described later.

Thereafter, the flow proceeds to step S21, in which closing date transmission determining process is performed. In step S21, at a prescribed closing date transmission time, a closing date transmission flag is set to ON, whereby the total count value which is the basis for calculating the charge of copying and size by size sheet count value are transmitted to the center. When the transmission of the total count value and the size by size sheet count value are transmitted, data of the next closing date transmission date and time are returned from the center side.

Thereafter, the flow proceeds to step S23 in which regular time transmission determining process is performed. More specifically, at a prescribed regular transmission time, regular transmission flag is set to ON, and various data related to the states of the copying machine described above are transmitted to the center. When transmission of the various data ends, present time data and data of the next regular transmission date and time are returned from the center.

Thereafter, the flow proceeds to step S25 in which warning transmission determining process is performed. In step S25, element data, count value of the jam counter and the count value of the PM counter are compared with prescribed threshold values, respectively. Based on the result of comparison, whether warning data and warning cancellation data are to be transmitted to the center or not is determined.

Thereafter, the flow proceeds to step S27 in which a user transmission determining process is performed. More specifically, when the operation mode is not the initialization mode and push switch 212 is pressed, a user transmission flag is set ON, whereby various data related to the states of the copying machine described above are transmitted to the center. Thereafter, the flow proceeds to step S29 in which a PM transmission determining process is performed. In step S29, when the PM counter of which count value is cleared to 0 by parts exchange, the count value before clearance is transmitted to the center, as will be described in detail later.

Thereafter, the flow proceeds to step S31, in which telephone connecting process is performed.

As will be described layer, when any transmission flag is set ON, modem 52 is activated, and a process for connecting a transmission line to the center side is executed. After connection to the communication line is established, data communication with CPU 91 on the center side is executed.

Details of respective subroutines will be described with reference to FIGS. 7 to 12.

Figure 6:
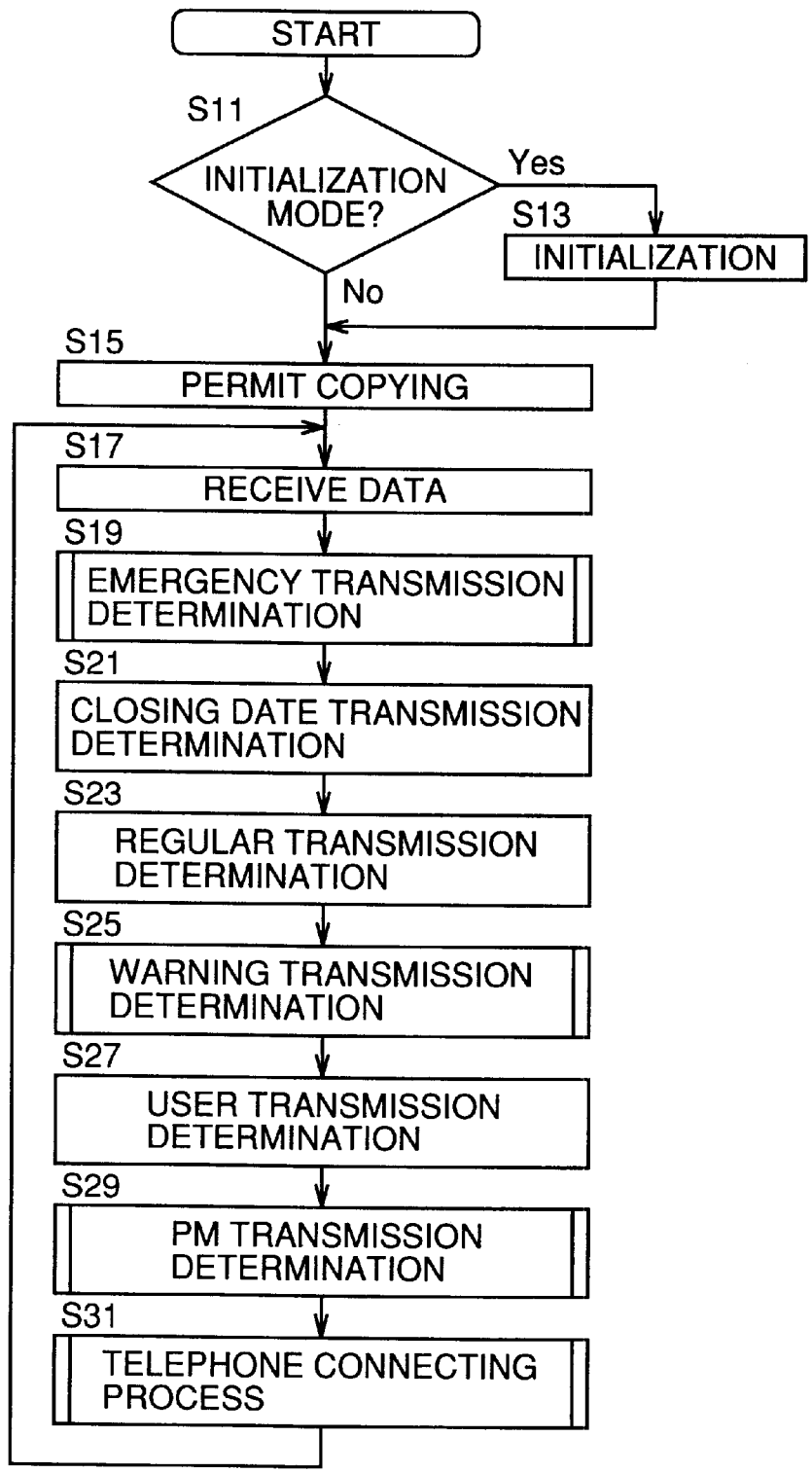
FIG. 6 is a flow chart representing a main routine of the process performed by the CPU of the data terminal.
Figure 7:
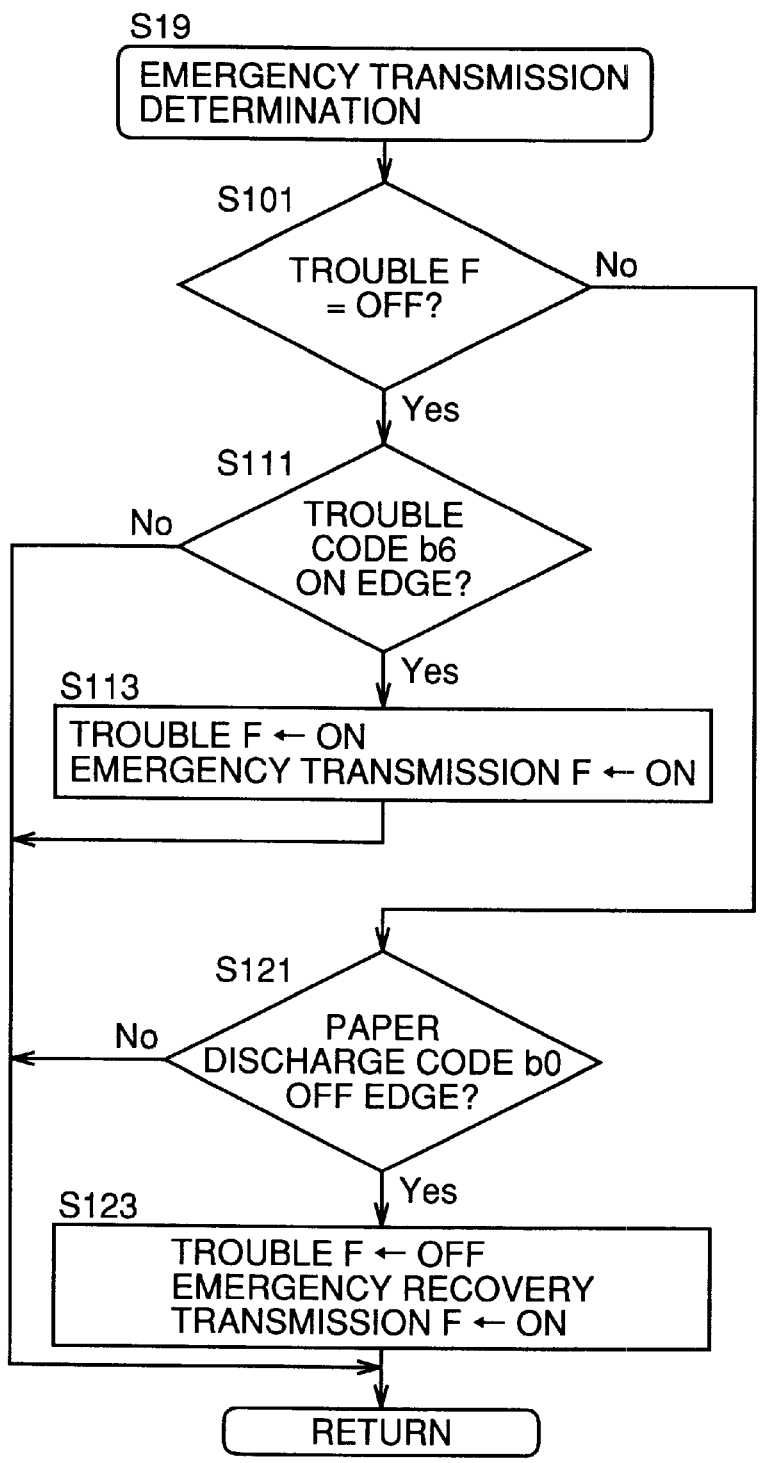
FIG. 7 is a flow chart representing an emergency transmission determining process of the flow chart shown in FIG. 6.

First, the emergency transmission determining process of step S19 shown in FIG. 6 will be described with reference to FIG. 7.

In this process, emergency transmission and emergency recovery transmission are managed. For example, when the trouble flag is OFF (YES in step S101) and an on edge of trouble code b6 from the copying machine is detected (YES in step S111), the trouble flag and the emergency transmission flag are set ON, respectively (step S113).

When the trouble flag is ON (NO in step S101) and an off edge of the paper discharge code b0 from the copying machine is detected (YES in step S121), the trouble flag is reset to OFF, and emergency recovery transmission flag is set to ON (step S123). This process is performed as it is considered that the trouble has been recovered if a paper is discharged from the copying machine.

When the emergency transmission flag or the emergency recovery flag are set to ON, the telephone connecting process, which will be described layer (see FIGS. 11 and 12) is performed, and trouble data or trouble recovery data are transmitted to the CPU 91 of the center.

Figure 8:
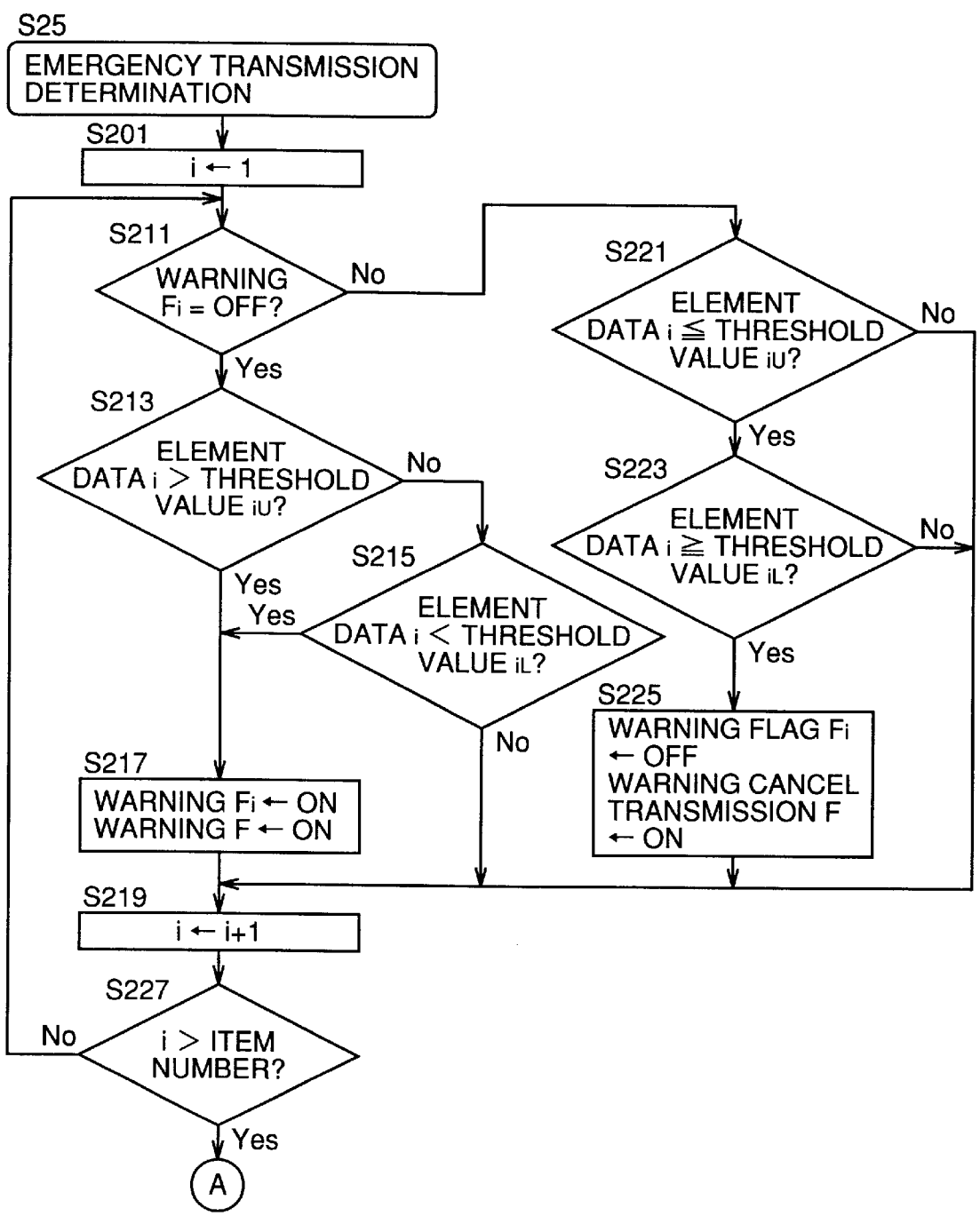
FIGS. 8 and 9 are flow charts representing a warning transmission determining process of the flow chart shown in FIG. 6.
Figure 9:
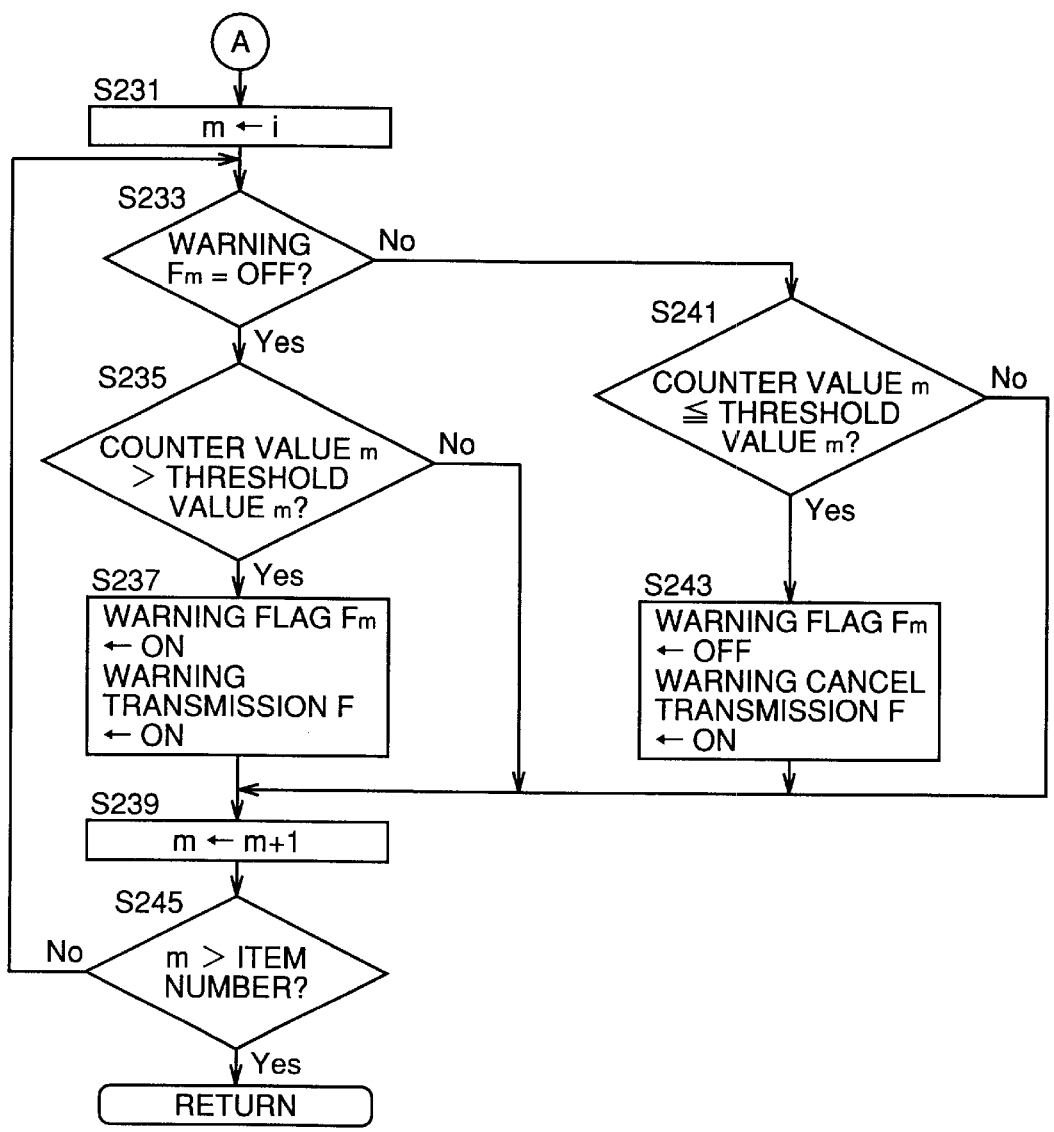

The warning transmission determining process of step S25 shown in FIG. 6 will be described with reference to FIGS. 8 and 9.

In the present process, warning transmission and warning cancellation transmission are managed.

Steps S201 to S227 are related to a process for executing warning transmission if value of the element data goes out of a particular tolerable range, or a process for executing warning cancellation transmission if the value returns within the tolerable range.

First, an initial value "1" is set to an item number i representing the type of the element data (step S201). Thereafter, in step S211, a warning flag related to the element data defined by item number i (at first, the element data of the first item) is determined. If the warning flag related to the element data in question is OFF (YES in step S211), whether the value of the element data is within the particular tolerable range of the element data or not, that is, whether the value is not higher than the upper limit iU and not lower than the lower limit iL is determined. If the value is out of the tolerable range (YES in step S213 or YES in S215), warning flag Fi and warning transmission flag related to the element data are set to ON, respectively (step S217). Accordingly, the telephone connecting process (FIGS. 11 and 12) is executed and the warning data is transmitted to the center.

When the warning flag of the element data defined by item number i is ON in step S211 (NO in step S211), whether the value of the element data has returned to be within the tolerable range or not is determined, and if returned (YES in S221 and YES in S223), warning flag Fi of the element data is reset to OFF, and warning cancellation transmission flag is set to ON (step S225). Accordingly, the telephone connecting process (FIGS. 11 and 12) is executed, and warning cancellation data is transmitted to the center.

When the above described processing is performed on every element data (YES in step S227), the process following step S231 will be executed.

Steps S231 to S245 are processes for executing, when the count values of the jam counter and the PM counter exceeded particular threshold values, the warning transmission, and when the count values return to be lower than the threshold values, the warning cancellation transmission.

First, an initial value i (the value of the last item number of the element data+1) is set in an item number m representing the type of the jam counter and the PM counter (step S231). Thereafter, in step S233, a warning flag related to the jam counter or the PM counter designated by the item number m is determined. Thereafter, if the warning flag related to the jam counter or the PM counter is OFF (YES in step S233), whether the count value is within a tolerable range particular to the counter, that is, whether the count value is below the threshold value is determined, and if the threshold value is exceeded (YES in step S235), the warning flag Fm for the counter and the warning transmission flag are set to ON (step S237). In response, the telephone connecting process (FIGS. 11 and 12) is executed and the warning data is transmitted to the CPU 91 of the center.

In step S233, if the warning flag related to the jam counter or the PM counter designated by item number m is ON (NO in step S233), whether the count value has returned to be within the threshold value is determined, and if it returned (YES in step S241), the warning flag Fm related to the counter is reset to OFF, and warning cancellation transmission flag is set to ON. In response, the telephone connecting process (FIGS. 11 and 12) is executed and warning cancellation data is transmitted to CPU 91 of the center.

When the above described processes are performed on every jam counter and PM counter (YES in step S245), the flow returns to the main routine. The warning transmission and warning cancellation transmission are managed in the above described manner.

Figure 10:
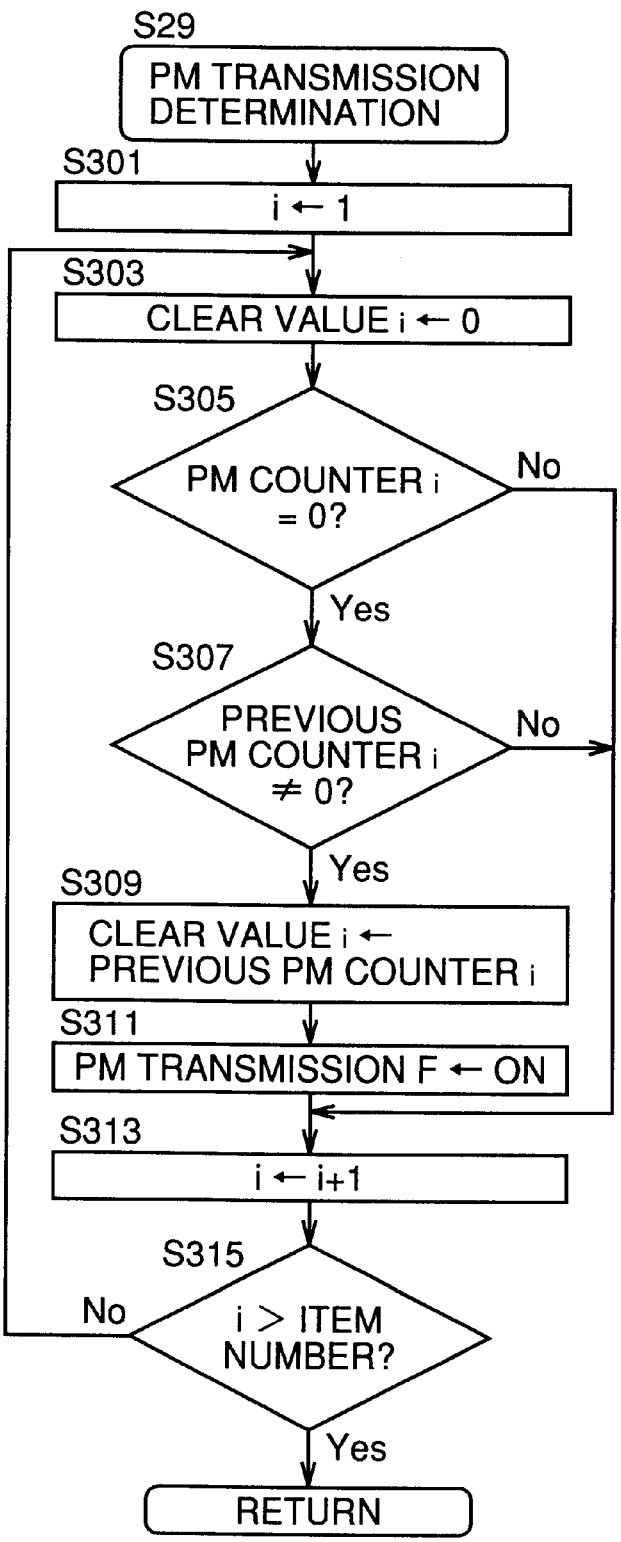
FIG. 10 is a flow chart representing a PM transmission determining process of the flow chart shown in FIG. 6.

The PM transmission determining process of step S29 shown in FIG. 6 will be described with reference to FIG. 10.

In this process, the PM transmission is managed. First, an initial value "1" is set to an item number i representing the type of the PM counter (step S301). Thereafter, the processes of steps S303 to S311 are executed, thereafter the value i is incremented (step S313), and the above described processes are repeated. More specifically, the above described processes are repeated with the type of the PM counter varied.

Steps S303 to S311 are related to the processes for storing, when the PM counter is cleared (YES in step S305 and YES in step S307), the count value immediately preceding clearing of the PM counter (step S309), and for setting the PM transmission flag to ON. Clearing of the PM counter is performed by a service operator when the component corresponding to the PM counter is exchanged.

When the PM transmission flag is set to ON (step S311), the telephone connecting process (FIGS. 11 and 12) is executed, and the PM data (type of the exchanged part and the count value immediately before the exchange) are transmitted to the center.

Figure 11:
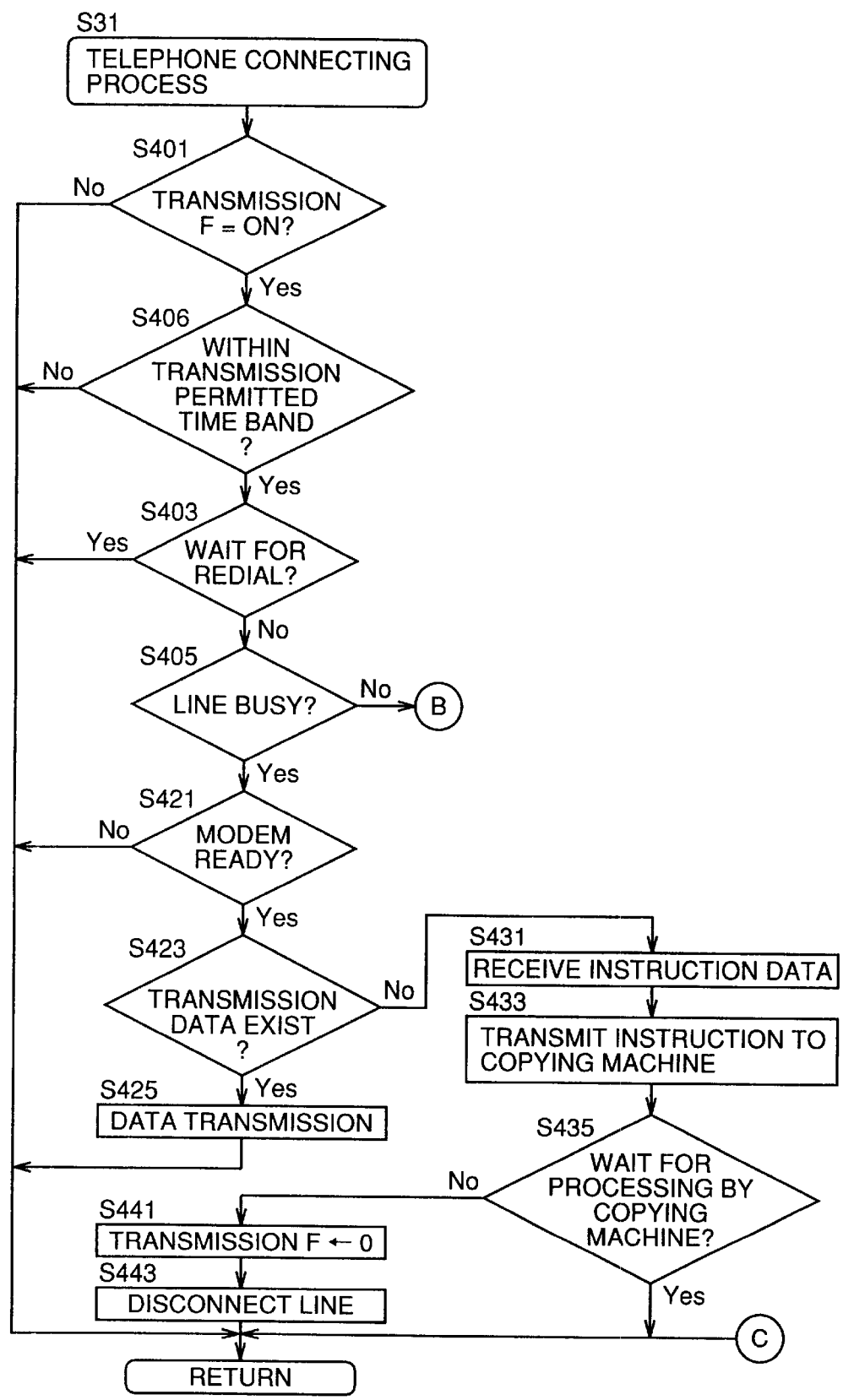
FIGS. 11 and 12 are flow charts representing a telephone connecting process of the flow chart shown in FIG. 6.

The telephone connecting process of step S31 shown in FIG. 6 will be described with reference to FIGS. 11 and 12.

In the present process, center calling process is performed corresponding to the ON state of any of the transmission flag, and after the communication line is connected, the data corresponding to the transmission flag are transmitted. Further, data communication with the center side CPU 91 is performed.

First, when any of the transmission flag is set to ON (YES in step S401), call of the center side mode 72 is instructed to modem 52 (step S409), under the condition that the operation is not in redial standby (NO in step S403), the present time is within the transmission permitted time band (YES in step S406), communication line to the center side modem 72 is not connected (NO in step S405), and the operation is not in the standby state after instruction of call of center side modem 72 to modem 52 (NO in step S407).

If it is NO in step S406, that is, when the time is within the transmission inhibited time band, the operation waits until the time reaches the transmission permitted time band. The transmission permitted time has been transmitted in advance from the center side unit (step S17 of FIG. 6), and stored on the copying machine side.

As a result of processing in step S409 described above, for example, when the telephone additionally provided for the communication line is busy and call of the center side modem 72 cannot be executed (YES in step S411), a time after a prescribed time period is set as a redial time (step S413). Accordingly, the determination in step S403 is kept "YES" until the redial time. More specifically, the process of step S409 is not executed. When the time reaches the redial time, the call of the center side modem 72 is again instructed to modem 52 (step S409).

In addition, when it is determined that the center side modem 72 is busy (including a case where there is no response from CPU 91 even if connection with modem 72 is established) as a result of transmission of a center selection signal from modem 52 to telephone network in response to the process of step S409 (YES in step S415), the redial time is set in the similar manner as described above (step S413), and when the set redial time comes, the process of step S409 is executed.

In response to the process of step S409, when the center selection signal is transmitted from modem 52 to the communication network and as a result, the communication line with the center side modem 72 is connected (YES in step S405), the data corresponding to the transmission flag which is set ON are transmitted to the center side (step S425) after ready standby of modem 52 (YES in step S421).

Figure 15:
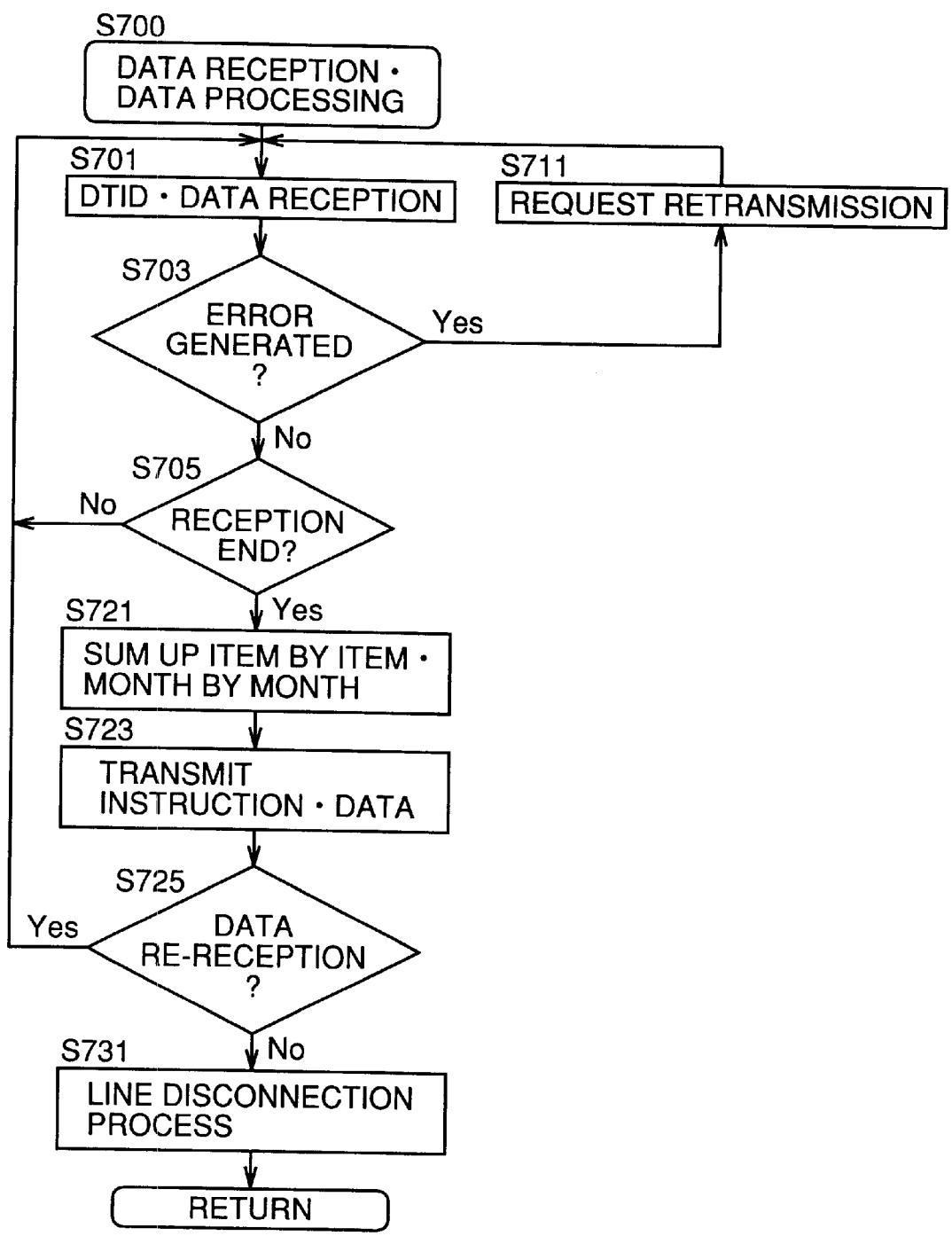
FIG. 15 is a flow chart representing data reception and data processing.

When there is no data left to be transmitted to the center side (NO in step S423), data transmitted from the center side is received (step S431, as to the data transmission process of the center, see step S725 of FIG. 15).

The received data includes an instruction for changing set conditions of the copying machine (setting change instruction), an instruction requesting an operation of the copying machine (operation instruction), or present time, next regular transmission time and data, next closing date transmission date and time, and so on. If there is a communication error, a data retransmission instruction is received (see step S711 of FIG. 15).

When the setting change instruction or operation instruction is received in step S431, the command and a parameter corresponding to the instruction is transmitted through serial I/F12 and serial I/F42 to CPU 41 (step S433). On the copying machine side 4, as already described, the process corresponding to the command mentioned above is executed in step S43 of FIG. 5. When the data from the center side is received and the data requires standby for the process in copying machine 4 (YES in step S435), the communication line is held as it is.

Here, the case where standby for the end of processing in copying machine 4 is necessary refers to such a case where the results can be obtained immediately, such as in the case of operating a developer to detect toner concentration. When transmission data is applied from the copying machine side after the standby (YES in step S423), data is again transmitted to the center side (step S425). If a standby for the end of the processing in the copying machine is not necessary (NO in steps S435), the transmission flag is reset to OFF (step S441), and thereafter the communication line is disconnected (step S443). In this manner, communication with the center is performed by the telephone connecting process.

The operation control of the computer on the center side unit (processing by CPU 91) will be described with reference to FIG. 13.

CPU starts processing when the power is turned on, and at first, executes setting of environment of the modem, a printer and the like (step S61). As regards the setting of environment of modem 72, initialization is performed in which the dial mode is set and whether automatic reception is accepted or not is determined, for example, and in addition, communication method is set to that communication method which has priority 1. Thereafter, the process for setting the following modes is executed in accordance with the key input operation of F1 to F7, which will be described later.

When F1 key is selected (YES in step S63), a mode for accepting machine type registration is set (step S65). More specifically, new registration of machine type name, the number of items of the element data, name of each element data, standard threshold value of each element data, standard threshold value of each count data and so on are accepted.

When F2 key is selected (YES in step S67), a mode for accepting registration of user master is set (step S69). More specifically, new registration of user name, address, telephone, machine type name, machine number, regular transmission date and time and so on is accepted. Further, (DT) of the data terminal is automatically set.

When F3 key is selected (YES in step S71), the state of trouble is displayed (step S73). More specifically, user information (user name, address, telephone number, machine type name) of a copying machine from which emergency transmission has been made as well as the date and time of occurrence of the trouble are displayed, together with the contents of the trouble, on display 92. Regardless of the operation of F3 key, the number of troubles is always displayed on a corner of display 92.

When F4 key is selected (YES in step S75), the state of warning is displayed (step S77). More specifically, user information and the like of the copying machine from which warning transmission has been made, are displayed together with the contents of warning, on display 92. Regardless of the operation of F4 key, the number of warning is always displayed on a corner of display 92.

When F5 key is selected (YES in step S79), state of not-yet received transmission is displayed (step S81). More specifically, user information of a copying machine which fails to perform regular transmission past the prescribed regular transmission time is displayed on display 92. Regardless of the operation of F5 key, the number of not-yet received transmission is always displayed on a corner of display 92.

When F6 key is selected (YES in step S83), user data display mode is entered (step S85). More specifically, when a user is selected, user information is displayed on display 92. When a sub menu is selected, count values of various counters (total counter, size by size paper counter, jam counter, trouble counter, PM counter) of the copying machine of the user as well as element data are displayed month by month or item by item.

When F7 key is selected (YES in step S87), a bill is printed (step S89). A printer connected to computer 90 is activated, and the bill for the copy charge calculated based on the count value of the total counter and a prescribed calculation expression is printed.

Figure 14:
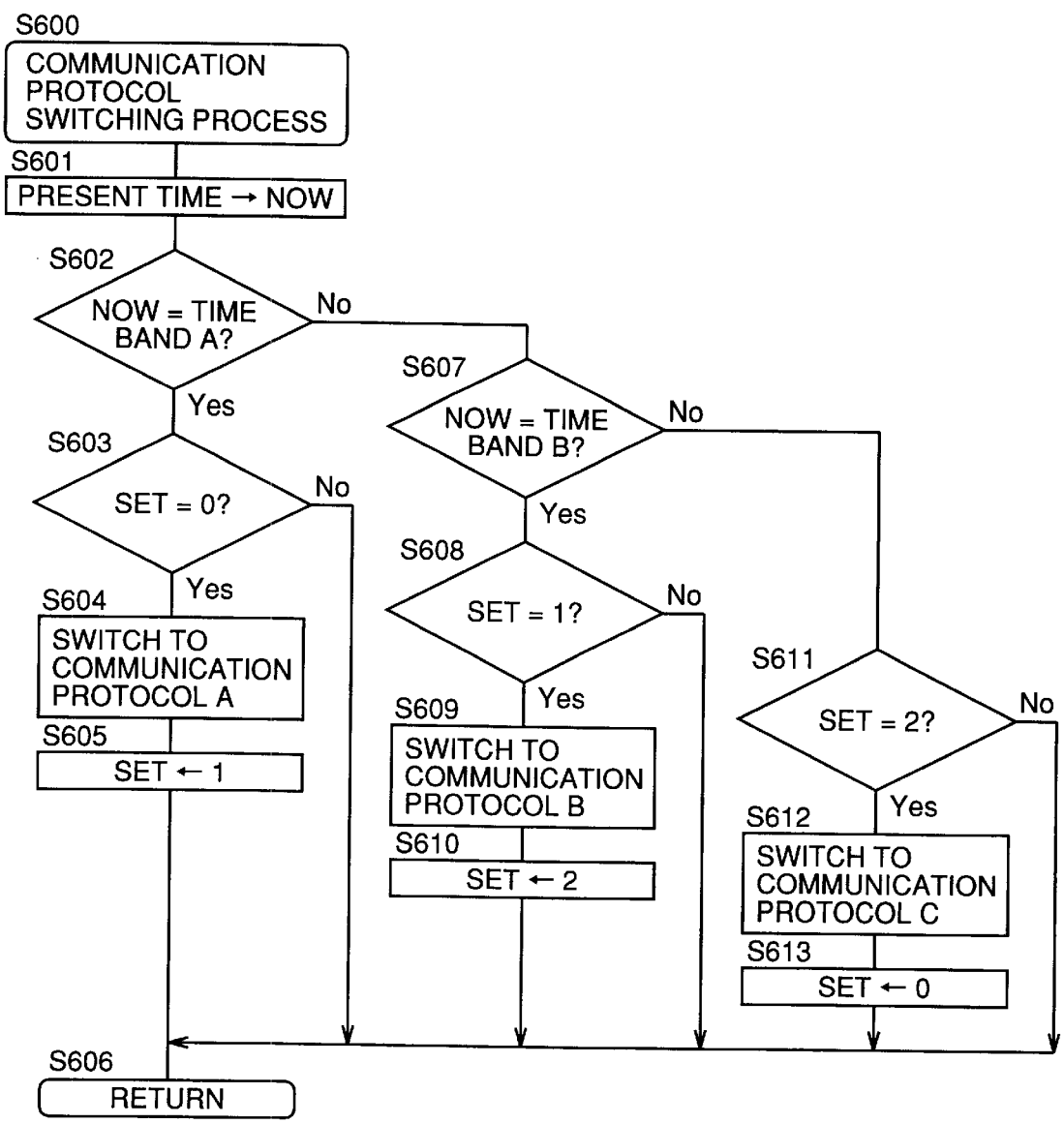
FIG. 14 is a flow chart representing a process of switching communication protocols.

The process of switching communication protocols will be described with reference to FIG. 14. The switching of communication protocols is performed by a periodical interruption process.

First, the present time is detected, and the present time is stored as a variable NOW (step S601). In accordance with the time table for switching communication protocol shown in FIG. 17, whether the variable NOW is within the time band of communication protocol A is determined (step S602), and whether the communication protocol switch flag SET is 0 or not is determined (step S603), and both are YES, the protocol is switched to communication protocol A (step S604). Thereafter, communication protocol switch flag SET is set to 1 (step S605).

When the variable NOW is not in the time band A, whether it is in a time band B or time band C is determined (step S607), and dependent on the determination, the communication protocol is switched to B or C, in the similar manner as in the case of communication protocol A. Thereafter, if the time band is B, the communication protocol switch flag SET is set to 2 (step S610). If the time band is C, the communication protocol switch flag SET is set to 0 (step S610).

Data reception and data processing will be described with reference to FIG. 15.

The control of FIG. 15 is performed when CPU 91 successively receives data transmitted from the side of the data terminal (step S700).

First, data reception process with the data terminal is performed (step S701). When there is a communication error (YES in step S703), retransmission of data is requested to data terminal side (step S711). When the reception process ends (YES in step S705), summing up item by item and month by month is performed, and data for screen display is prepared (step S721) in accordance with operator's selection (see step S85 of FIG. 13).

When the communication is based on the regular transmission, the next regular transmission date and time, closing date transmission date and time and present time are transmitted to the data terminal (step S725). When data is not transmitted in return from the data terminal in step S725 (NO in step S725), a process for disconnecting the communication line is executed (step S731), and the interruption process is terminated. When data is transmitted in return from the data terminal (YES in step S727), data reception process is again performed (step S701).

(2) Second Embodiment

The second embodiment of the present invention will be described in the following. In the first embodiment, as respective copying machines have different communication protocols, the communication protocols are switched in turn based on time. By contrast, in the second embodiment, the centralized management unit has a plurality of communication methods, which methods are successively switched to find a communicable method, and communication with the management unit of the copying machine is established.

Basic configuration and operations of the units are the same as those of the first embodiment, and therefore only the differences will be described.

Figure 12:
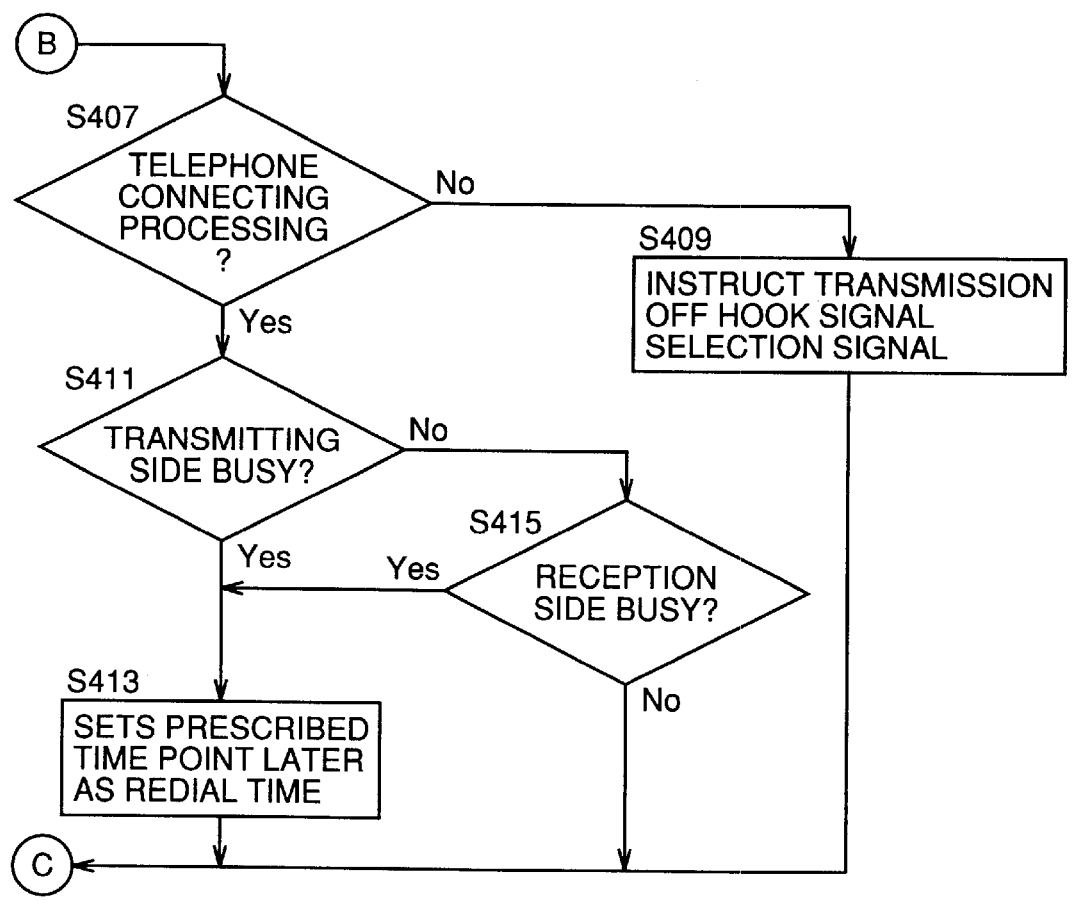

In the second embodiment, the following points differ from the flow chart shown in FIG. 12 described with respect to the first embodiment.

It may be determined YES in step S415 in FIG. 12, when the center selection signal is transmitted from modem 52 to the telephone network in response to the process of step S409, the communication method in compliance with which the data terminal transmit the data does not match the communication method set in the center side modem 72, and therefore data transmission is abnormally terminated by modem 52 or center side modem 72.

Figure 13:
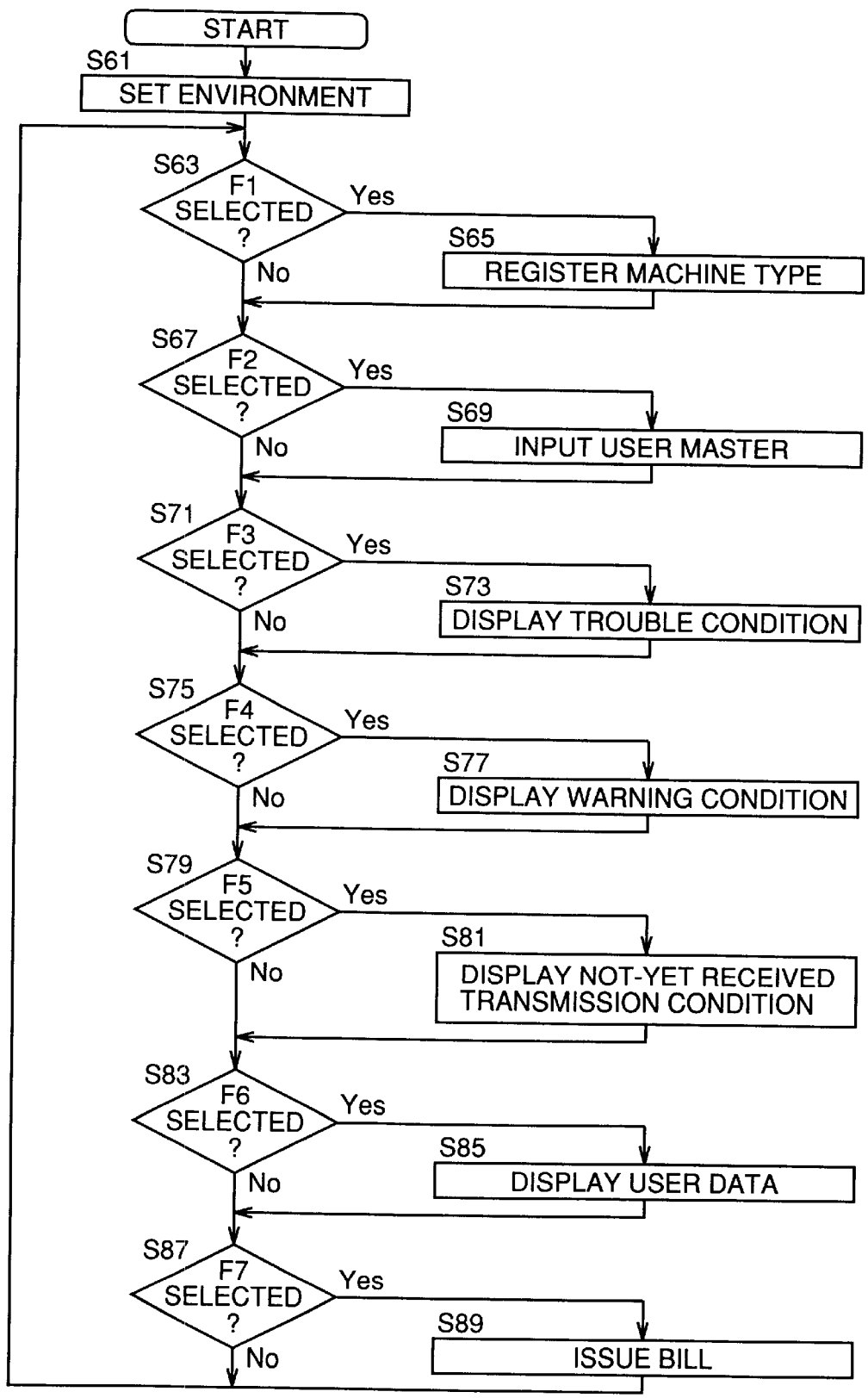
FIG. 13 is a flow chart representing a process performed by the CPU at the center of the system.

In FIG. 13 representing the operation control of the computer on the center side unit (processing by CPU 91), the communication method may include CCITT method and Bell method, and in the second embodiment, it is assumed that the communication method of priority 1 is CCITT method and communication method of priority 2 is Bell method.

Figure 19:
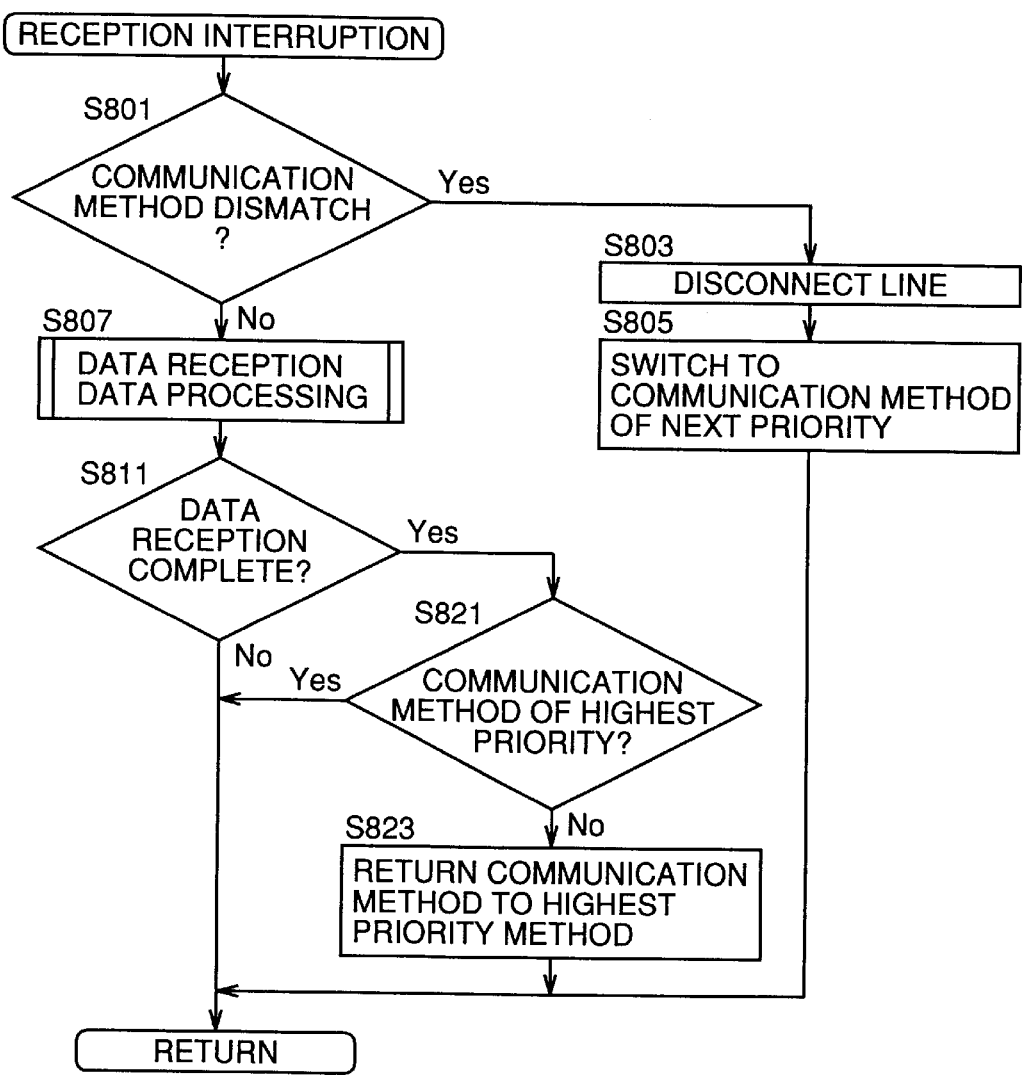
FIG. 19 is a flow chart representing the process performed by the CPU at the center of the system in accordance with a second embodiment.
Figure 20:
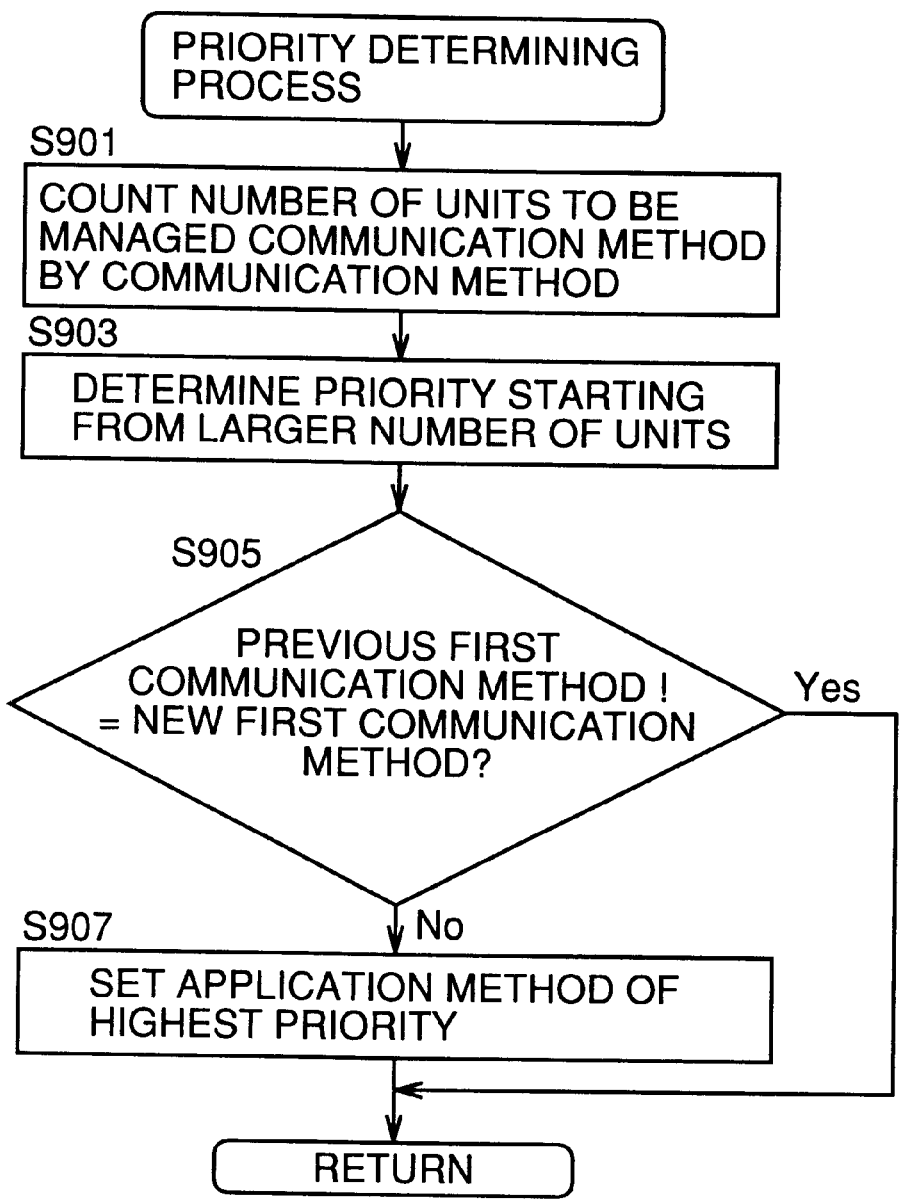
FIG. 20 is a flow chart representing a process for determining priority of communication methods in the system of the second embodiment.

The process corresponding to FIG. 14, in accordance with the second embodiment will be described. In the second embodiment, an interruption process generated when modem 72 receives a call from data terminal side is performed. Referring to FIGS. 19 and 20, where reception interruption occurs, first, whether the communication method used by the data terminal for transmitting the data is the same as the communication method set in modem 72 at that time is determined (step S801). If the communication method in accordance with which the data terminal transmitted the data does not match the communication method set in the modem 72 at that time (YES in step S801), communication disconnecting process is performed immediately (step S803), and modem 72 is set to another communication method of the next priority.

When the communication method in accordance with which the data terminal transmitted the data matches the communication method set in modem 72 at that time (NO in step S801), data transmitted from the data terminal side are successively received by CPU 91, and the received data are subjected to prescribe processing (step S807).

As the contents of data processing are the same as those described with reference to FIG. 15 of the first embodiment, description thereof is not repeated.

Thereafter, when transmission/reception of data with the data terminal is completed successfully (YES in step S811), whether the communication set in modem 72 at present is the communication method of highest priority or not is detected. If it is not of the highest priority NO in step S821), the setting of modem 72 is returned to the communication method of the highest priority (step S823).

The process of switching priorities of the communication methods in accordance with the number of copying machines transmitting data to the centralized management unit in accordance with respective communication methods among the copying machine management units connected to the copying machines managed by the centralized management unit will be described with reference to FIG. 20.

First, the number of copying machines managed by the center are counted communication method by communication method used for transmitting the data by the copying machine management units attached to the copying machines (step S901). Thereafter, priorities are given to the communication methods starting from that communication method which is used by largest number of copying machines counted (step S903). Finally, if the newly determined communication method of the highest priority is different from the previous communication method of the highest priority (YES in step S905), the modem is set to the newly determined communication method of the highest priority (step S907).

Though a centralized management unit and the system thereof for copying machines have been described, the embodiment of the present invention is not limited thereto. The present invention can be similarly applied to a centralized management unit and the system thereof for managing, through communication line, inventory (stock) of automatic vending machines of beverages or cigarettes, for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A centralized management unit for managing and interpreting a plurality of management units having different prescribed communication methods using different communication protocols, said each management unit collecting various data of a connected unit connected thereto and, sending said collected data to said centralized management unit with one of said prescribed communication methods, comprising:
   a communication device operable in at least two different communication processing methods;
   a timer;
   a storage medium storing a table representing correlation between the communication processing methods and time bands for the respective communication processing methods; and
   a controller to control said communication device such that one communication processing method is selected by comparing time measured by the timer with said table and the communication is effected by the selected communication processing method.

2. The centralized management unit according to claim 1, wherein the time band set in advance in said centralized management unit is stored from the management unit through the communication line.

3. The centralized management unit according to claim 1, wherein time band allocated to each of the communication processing methods is adjusted in accordance with the number of communication processing methods of the management unit with which communication is performed.

4. The centralized management unit according to claim 1, wherein the different communication processing methods use different communication protocols from one another.

5. A centralized management unit receiving, from a plurality of different types of management units having different communication processing methods using different communication protocols, each including a collector for collecting various data of a connected unit and a connector to a communication line, said various data through said communication line and a terminal adapter, for managing and interpreting the connected unit connected to said management unit, comprising:
   a terminal adapter allowing reception from said plurality of different types of said management units having said different communication processing methods in accordance with which said various data are transmitted through said communication line; and
   a setter for setting a communication processing method of the terminal adapter in accordance with a prescribed priority.

6. The centralized management unit according to claim 5, further comprising a switch for switching, when reception of said various data in accordance with the communication processing method set by said setter fails, said communication processing method to a communication processing method having lower priority.

7. The centralized management unit according to claim 5, wherein management of the units is performed communication processing method by communication processing method based on the received various data.

8. The centralized management unit according to claim 5, wherein the communication processing method is returned to that one which has the highest priority, when data reception in accordance with a communication processing method of which priority is not the highest is successful.

9. The centralized management unit according to claim 5, wherein the communication processing method of said terminal adapter is set starting from that one which is employed by largest number of management units transmitting the various data in accordance with the communication processing method.

10. The centralized management unit according to claim 5, wherein the different communication processing methods use different communication protocols from one another.

11. A unit management system including a plurality of management units having different communication processing methods using different communication protocols, said units provided with a collector for collecting various data of connected units and a connector with a transmission line, and a centralized management unit for managing and interpreting, by receiving said various data from each of said management units through said communication line and a terminal adapter, connected to said management units, wherein
   said centralized management unit includes
      a terminal adapter allowing reception of a plurality of different types of said units having different communication processing methods in accordance with which said various data are transmitted over said communication line, and
      a setter for setting communication processing method of the terminal adapter in accordance with a prescribed priority.

12. The unit management system according to claim 11, further comprising switch for switching, when reception of said various data in accordance with the communication processing method set by said setter fails, said communication processing method to another communication processing method of lower priority.

13. The unit management system according to claim 11, wherein said centralized management unit performs unit management communication processing method by communication processing method, based on received various data.

14. The unit management system according to claim 11, wherein the different communication processing methods use different communication protocols from one another.

15. A management system, comprising:
   a first transmitter to transmit information of a first device with a first communication processing method using a communication protocol;
   a second transmitter to transmit information of a second device with a second communication processing method using a communication protocol different from said first communication processing method; and
   a centralized management unit connected to said first and second devices via communication line for managing and interpreting thereof; wherein
      said centralized management unit is capable of transmitting information with said first and second communication processing methods, and receiving information transmitted by said first and second communication processing methods.

16. The management system according to claim 15, wherein said first and second devices are copying machines.

17. The management system according to claim 15, wherein the first and second communication processing methods use different communication protocols from one another.

* * * * *